United States Patent [19]
Davies et al.

[11] Patent Number: 5,480,189
[45] Date of Patent: Jan. 2, 1996

[54] AUTOMOTIVE VEHICLE FRAME

[75] Inventors: Richard G. Davies, Dearborn Heights; Peter H. Thornton, Dearborn, both of Mich.

[73] Assignee: Ford Motor Company, Dearborn, Mich.

[21] Appl. No.: 289,459

[22] Filed: Aug. 12, 1994

[51] Int. Cl.$^6$ ................................................. B62D 21/00
[52] U.S. Cl. ............................ 280/797; 280/784; 280/800
[58] Field of Search ..................................... 280/784, 797, 280/820

[56] References Cited

U.S. PATENT DOCUMENTS

| | | | |
|---|---|---|---|
| 1,737,810 | 12/1929 | Tarbox | 280/797 |
| 2,194,356 | 3/1940 | Eklund | 280/797 |
| 2,335,546 | 11/1943 | Sladky et al. | 280/797 |
| 2,901,266 | 8/1959 | Lindsay | 280/797 |
| 3,794,348 | 2/1974 | Fischer | 280/784 |
| 3,983,962 | 10/1976 | Torke | 188/377 |
| 4,579,185 | 4/1986 | Wakasa | 280/784 |
| 4,796,946 | 1/1989 | Wilson et al. | 296/146.6 |

FOREIGN PATENT DOCUMENTS

| | | |
|---|---|---|
| 2750744 | 5/1979 | Germany . |
| 61-282173 | of 1986 | Japan . |
| 3-121923 | 5/1991 | Japan . |
| 619494 | 3/1949 | United Kingdom . |

*Primary Examiner*—Kenneth R. Rice
*Attorney, Agent, or Firm*—Gregory P. Brown; Roger L. May

[57] ABSTRACT

Accordingly, the present invention is an automotive vehicle frame including a forward portion, a rear portion and a central portion disposed between the forward portion and the rear portion. Either one of the forward and rear portions include at least one rail extending longitudinally. The rail includes a first structural member having an open cross-section and marginal flanges. The rail also includes a second structural member closing the open cross-section of the first structural members. The second structural member includes edge portions disposed over and in abutting relationship with the marginal flanges.

10 Claims, 2 Drawing Sheets

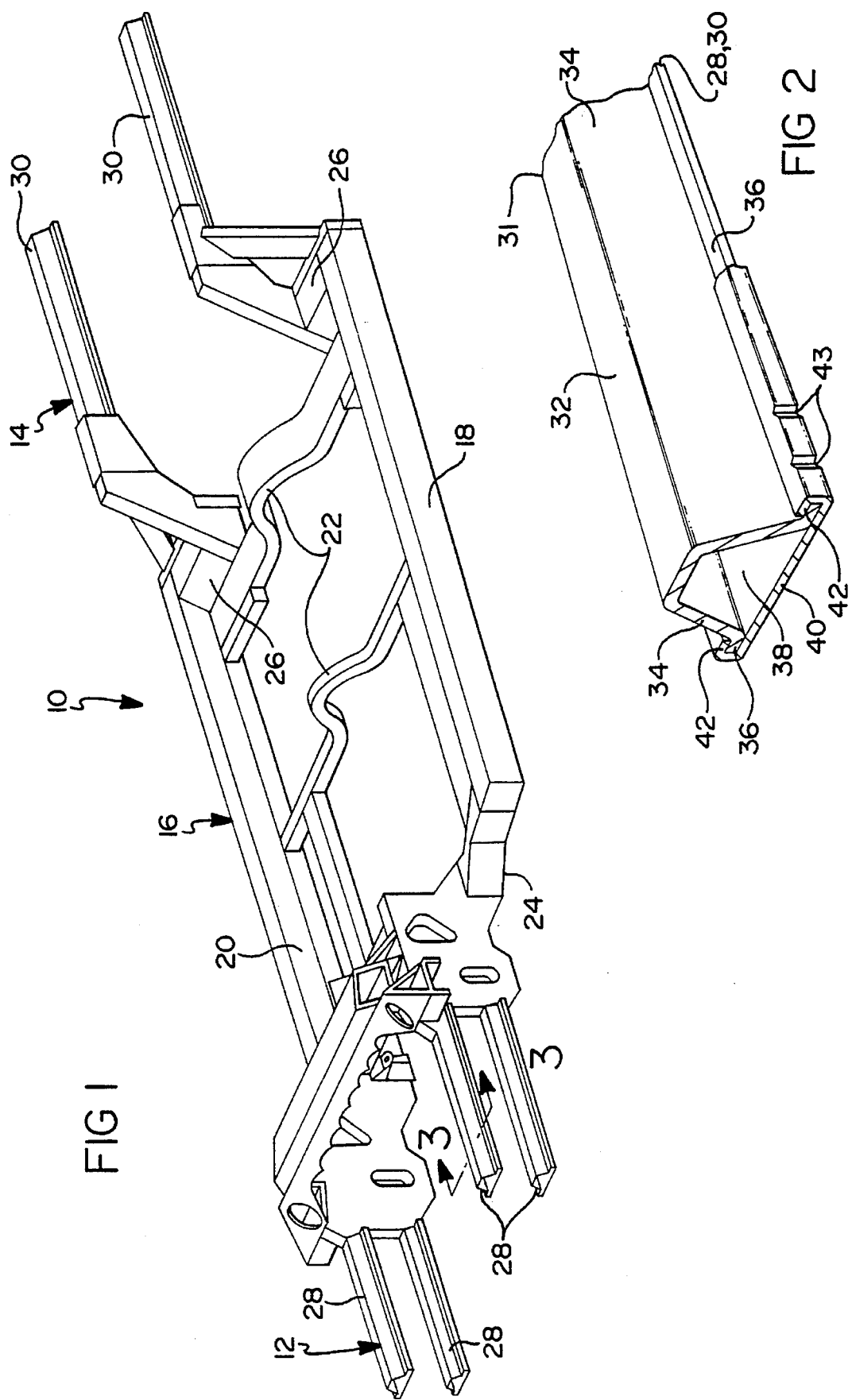

AUTOMOTIVE VEHICLE FRAME

BACKGROUND OF THE INVENTION

1. Field of the Invention

The present invention relates generally to automotive vehicle frames and, more specifically, to energy absorbing forward and rear portions of an automotive vehicle frame.

2. Description of the Related Art

It is known to construct frames for vehicles such as automotive vehicles defining the general shape of the automotive vehicle and for supporting its various load-bearing functional components from metal components fabricated in a variety of manners. In the interest of enhancing fuel economy of automotive vehicles, great attention has been given to fabricating vehicular components from light weight materials. On the other hand, a competing interest in the design of the vehicle frame is the dissipation of energy in the unfortunate event of a collision of the vehicle.

It is also known that vehicle frames include forward, rear and central portions. Generally, the forward and rear portions are designed to, among other things, absorb and dissipate energy in the event of a collision or impact of sufficient predetermined force on the automotive vehicle. The forward and rear portions typically include hollow, longitudinal rails which are often fabricated from structural members made of a steel material by spot welding the structural members together. In steel material, structural transformations occur during a cooling period after the spot weld has been formed which act to strengthen the spot weld itself so that it can be stronger than the surrounding base steel material.

One disadvantage of using steel material in structural members of the forward and rear portions of the vehicle frame is the increased weight in the overall vehicle frame and, therefore, the vehicle. Accordingly, attempts have been made to fabricate the structural members of the forward and rear portions of the vehicle frame from lighter materials such as aluminum, magnesium or alloys thereof. Aluminum or magnesium spot welds are soft and porous with more voids than steel materials. Unfortunately, the structural transformations which take place during the cooling period after spot welding steel materials do not take place after spot welding aluminum or magnesium materials.

For a given aluminum or magnesium material, it is known to increase the weld strength in the welded aluminum or magnesium structural members by increasing the size and number of the spot welds used. However, the thickness of the welded aluminum or magnesium structural members limits the maximum size of the spot weld which can be produced in any given situation. Further, reducing the number of spot welds in the welded aluminum or magnesium structural members is of particular relevance because of electrode contamination and the consequent shortening of tip life of the spot welder due to the electrical power used during spot welding.

Buckling and folding may occur during the collision of the welded aluminum or magnesium structural members. Unfortunately, it is quite possible for separation of the welded aluminum or magnesium structural members to occur before significant crush of these structural members has taken place. When welded structural members separate to create open form sections, the vehicle frame tends to have considerable reduced load bearing ability in comparison to closed form sections. In this case, weld separation can lead to a diminished energy absorption and dissipation performance.

SUMMARY OF THE INVENTION

Accordingly, the present invention is an automotive vehicle frame including a forward portion, a rear portion and a central portion disposed between the forward portion and the rear portion. Either one of the forward and rear portions include at least one rail extending longitudinally. The rail includes a first structural member having an open cross-section and marginal flanges. The rail also includes a second structural member closing the open cross-section of the first structural members. The second structural member includes edge portions disposed over and in abutting relationship with the marginal flanges.

One feature of the present invention is that an automotive vehicle frame is provided. Another feature of the present invention is that the automotive vehicle frame has forward and rear portions fabricated from relatively lightweight aluminum or magnesium materials. Yet another feature of the present invention is that the forward and rear portions have structural members hem flanged together. Still another feature of the present invention is that the structural relationship between hem flanged structural members significantly reduces spot weld separation between the structural members during a collision.

Other features and advantages of the present invention will be readily appreciated as the same becomes better understood after reading the subsequent description taken in light of the accompanying drawings.

BRIEF DESCRIPTION OF THE DRAWINGS

FIG. 1 is a perspective view of an automotive vehicle frame according to the present invention.

FIG. 2 is a partial enlarged fragmentary perspective view of a portion of the automotive vehicle frame of FIG. 1.

DESCRIPTION OF THE PREFERRED EMBODIMENT(S)

Figure 3:
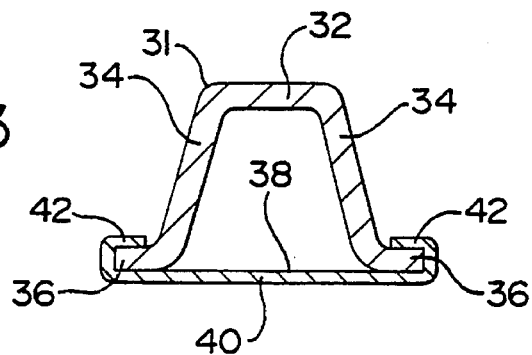
FIG. 3 is a sectional view taken along lines 3—3 of FIG. 1.

Turning now to the drawings, and in particular FIG. 1 thereof, one embodiment of an automotive vehicle frame, according to the present invention, is generally shown at 10. The vehicle frame 10 includes a forward portion or subassembly, generally indicated at 12, a rear portion or subassembly, generally indicated at 14, and a central portion, generally indicated at 16, disposed therebetween. The central portion 16 includes longitudinally extending side rails 18 and 20 as well as a lateral extending cross members 22 which interconnect the side rails 18 and 20. The central portion 16 also includes front and rear torque boxes 24 and 26 interconnecting the forward and rear portions 12 and 14 to the side rails 18 and 20, respectively.

Referring to FIGS. 1 through 4, the forward and rear portions 12 and 14 each include, at least one, preferably a pair of hollow structural members or rails 28 and 30, respectively, according to the present invention. Preferably, the rear portion 14 includes one pair of the rails 30 while the forward portion 12 includes two pairs of the rails 28. The rails 28 and 30 are disposed in spaced parallel relationship with respect to each other and extend forwardly and rearwardly, respectively, and longitudinally with respect to the central portion 16. Each of the rails 28 and 30 have a first structural or hat member 31 including two lateral sides 34 and a web 32 therebetween extending laterally and longitudinally. The web 32 and sides 34 define a generally inverted U-shaped open cross-section. The hat member 31 also includes marginal flanges 36 extending laterally and longitudinally from the sides 34 and generally parallel to the web 32 to form a generally "hat" shaped configuration. Each of the rails 28 and 30 further include a second structural or closure member 38 closing the hat member 31. The closure member 38 includes a body 40 and edge portions 42 located on the lateral sides of the body 40 extending laterally and longitudinally. The edge portions 42 are disposed in spaced parallel relationship with respect to the body 40 of the closure member 38. The marginal flanges 36 of the hat member 31 are disposed in abutting relationship with the body 40 of the closure member 38 and between the body 40 and the edge portions 42 as illustrated in FIG. 3.

Figure 4:
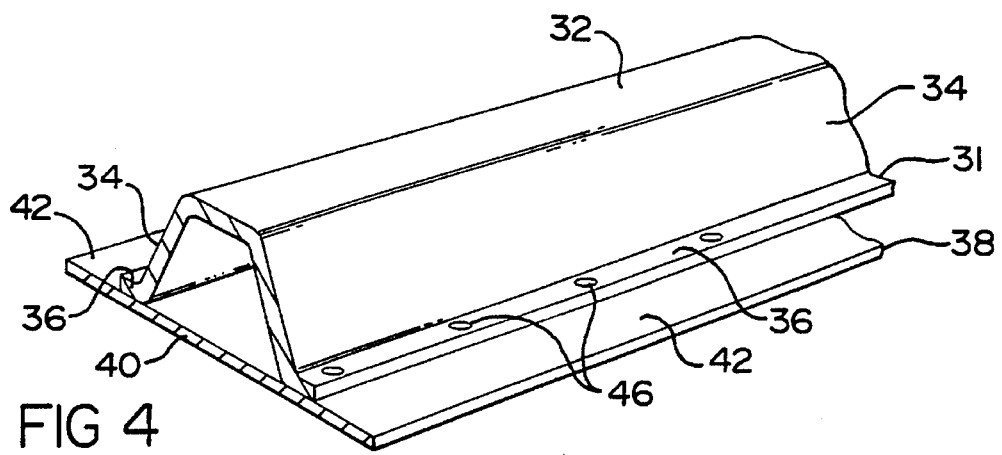
FIG. 4 is a view similar to FIG. 2 illustrating partial assembly.

Referring to FIG. 4, the body 40 of the closure member 38 is fixedly secured to the marginal flanges 36 of the hat member 31. More specifically, the marginal flanges 36 of the hat member 31 are spot welded to the body 40 of the closure member 38 at predetermined points 46 along the longitudinal expanse of the marginal flanges 36 as illustrated in FIG. 4. The edge portions 42 are then folded over the marginal flanges 36 to form a hem flange between the hat member 31 and closure member 38. Alternatively, the closure member 38 may be spot welded to the hat member 31 at the marginal flanges 36 through the edge portions 42 and the body 40 after the edge portions 42 are folded over the marginal flanges 36.

The forward and rear portion 12 and 14 are made of a lightweight material, for example, an aluminum or magnesium material. The rails 28 and 30 may further include weakened areas or recesses 43 disposed at predetermined points therealong which provide lower compressive stiffness of the forward and rear portions 12 and 14 compared with that of the central portion 16.

Figure 5:
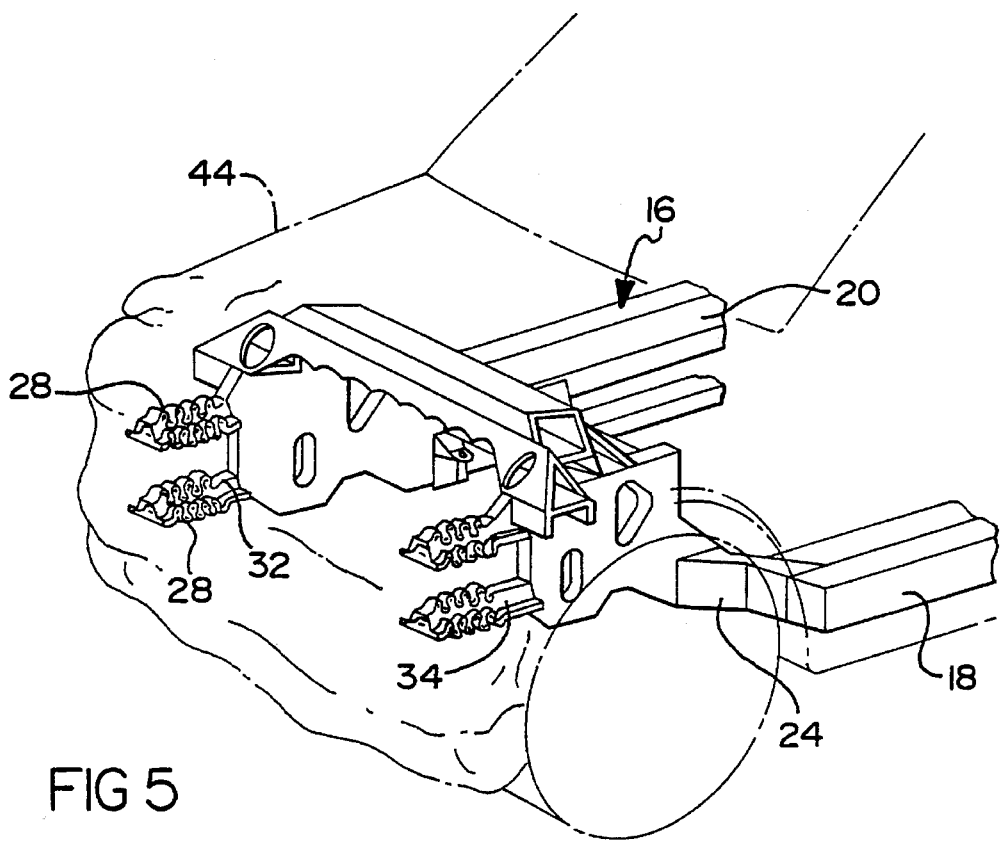
FIG. 5 is a partial perspective view of the automotive vehicle frame of FIG. 1 following a frontal collision.

Referring now to FIG. 5, a vehicle 44 employing the vehicle frame 10, according to the present invention, is illustrated. The vehicle 44 has experienced a collision resulting in damage to its front and specifically causing crush of the forward portion 12 of the vehicle frame 10. However, and due in part to the structure of the forward portion 12 as described herein, the rail 28 of the forward portion 12 will deform in a predetermined accordion-like manner without separation or creating open form sections at the hem flange between the closure member 38 and the hat member 31. As a result, more energy is absorbed by the forward and rear portions 12 and 14 of the vehicle frame 10 resulting in lower deceleration rates of the vehicle and a greater dissipation of the energy of the collision.

The present invention has been described in an illustrative manner. It is to be understood that the terminology which has been used is intended to be in the nature of words of description rather than of limitation.

Many variations and modifications of the present invention are possible in light of the above teachings. Therefore, within the scope of the appended claims, the present invention may be practiced otherwise than as specifically described.

What is claimed is:

1. An automotive vehicle frame comprising:

a forward portion;

a rear portion;

a central portion disposed between said forward portion and said rear portion; and either one of said forward and rear portions including at least one rail made of metal from a family of metals including aluminum and magnesium extending longitudinally, said at least one rail having a first structural member having an open cross-section and marginal flanges and a second structural member closing the open cross-section of said first structural member, said second structural member having edge portions disposed over and in abutting relationship with said marginal flanges and welded to said marginal flanges.

2. An automotive vehicle frame as set forth in claim 1 wherein said marginal flanges are welded to said second structural member at predetermined points along the longitudinal expanse of said marginal flanges.

3. An automotive vehicle frame as set forth in claim 1 wherein said second structural member has a body and said edge portions being located on either side of said body.

4. An automotive vehicle frame as set forth in claim 3 wherein said marginal flanges are welded to said body.

5. An automotive vehicle frame as set forth in claim 3 wherein said edge portions are welded to said marginal flanges.

6. An automotive vehicle frame comprising:

a forward portion;

a rear portion;

a central portion disposed between said forward and rear portions; and either one of said forward and rear portions including a pair of hollow rails made of metal from family of metals including aluminum and magnesium and disposed in spaced parallel relationship with respect to each other and extending longitudinally with respect to said central portion, said rails having a hat member with a web and two lateral sides which substantially define a U-shaped cross-section and marginal flanges and a closure member closing the U-shaped cross-section with a body and edge portions located on either side of said body, said edge portions being disposed in spaced parallel relationship with said body, said marginal flanges being welded to said closure member and disposed in abutting relationship with said body and between said body and said edge portions.

7. An automotive vehicle frame as set forth in claim 6 wherein said marginal flanges are welded to said closure member at predetermined points along the longitudinal expanse of said marginal flanges.

8. An automotive vehicle frame as set forth in claim 6 wherein said marginal flanges are welded to said body of said closure member.

9. An automotive vehicle frame as set forth in claim 6 wherein said edge portions are welded to said marginal flanges.

10. An automotive vehicle frame as set forth in claim 6 wherein said rails include weakened areas disposed at predetermined points therealong providing lower compressive stiffness of the forward and rear portions compared with that of said central portion.

* * * * *